United States Patent
Kijima

(10) Patent No.: US 6,797,774 B2
(45) Date of Patent: Sep. 28, 2004

(54) POLYOLEFIN RESIN FOR HOT-MELT ADHESIVE

(75) Inventor: Masato Kijima, Chiba (JP)

(73) Assignee: Idemitsu Petrochemical Co., Ltd., Tokyo (JP)

(*) Notice: Subject to any disclaimer, the term of this patent is extended or adjusted under 35 U.S.C. 154(b) by 0 days.

(21) Appl. No.: 10/297,576

(22) PCT Filed: Jun. 12, 2001

(86) PCT No.: PCT/JP01/04947
§ 371 (c)(1), (2), (4) Date: Dec. 12, 2002

(87) PCT Pub. No.: WO01/96490
PCT Pub. Date: Dec. 20, 2001

(65) Prior Publication Data
US 2004/0039117 A1 Feb. 26, 2004

(30) Foreign Application Priority Data
Jun. 14, 2000 (JP) ........................................ 2000-178420

(51) Int. Cl.$^7$ .............................................. C08L 23/12
(52) U.S. Cl. ........................ 525/55; 525/197; 525/240; 526/351; 524/274; 524/77
(58) Field of Search .......................... 525/55, 197, 240; 524/274, 77; 526/351

(56) References Cited

U.S. PATENT DOCUMENTS

| | | | |
|---|---|---|---|
| 4,522,982 A | * 6/1985 | Ewen | 525/240 |
| 5,454,909 A | * 10/1995 | Morganelli | 162/55 |
| 5,539,056 A | * 7/1996 | Yang et al. | 525/240 |
| 5,736,613 A | 4/1998 | Kijima et al. | |
| 5,786,427 A | 7/1998 | Kijima et al. | |
| 6,423,782 B1 | 7/2002 | Yukimasa et al. | |

FOREIGN PATENT DOCUMENTS

| | | |
|---|---|---|
| EP | 1 095 951 | 5/2001 |
| JP | 8-109360 | 4/1996 |
| WO | 99/20664 | 4/1999 |
| WO | WO 99/67303 | 12/1999 |
| WO | 01/25300 | 4/2001 |

OTHER PUBLICATIONS

Bernhard Rieger et al.: "Unsymmetric ansa–zirconocene complexes with chiral ethylene bridges: influence of bridge conformation and monomer concentration on the stereoselectivity of the propene polymerization reaction" Organometallics, American Chemical Society, vol. 13, pp. 647–653, 1994.

William J. Gauthier et al.: "Elastomeric poly(propylene): influence of catalyst structure and polymerization conditions on polymer structure and properties" Macromolecules, Americal Chemical Society, vol. 28, pp. 3771–3778, 1995.

* cited by examiner

*Primary Examiner*—Roberto Rabago
(74) *Attorney, Agent, or Firm*—Oblon, Spivak, McClelland, Maier & Neustadt, P.C.

(57) ABSTRACT

The present invention provides a polyolefin resin for hot melt adhesives containing [I] a propylene polymer in an amount of 20 to 99 mass %, and [II] an adhesive capacity applying resin in an amount of 80 to 1 mass %, wherein [I] the propylene polymer satisfies the requirements of (1) a meso pentad fraction (mmmm) is from 0.2 to 0.6; and (2) a racemic pentad fraction (rrrr) and (1−mmmm) satisfy the relation: $[rrrr/(1-mmmm)] \leq 0.1$. The polyolefin resin for hot melt adhesives is superior in thermostability or flowing ability at high-temperature, easy for coating, environmentally friendly with little fear of generating toxic gas in the disposal and incineration, superior in adhesive property to lowly polar substances and in heat resistance of the adhesion face.

12 Claims, No Drawings

POLYOLEFIN RESIN FOR HOT-MELT ADHESIVE

TECHNICAL FIELD

The present invention relates to a resin for hot melt adhesives used for sanitary materials, for packaging, for bookbinding, for fibers, for woodworks, for electricity materials, for can manufacturing, for construction, for bag making, etc. More particularly, the present invention relates to a new polyolefin resin for hot melt adhesives superior in heat resistance and flowing ability at high-temperature and superior in adhesive property to lowly polar substances.

BACKGROUND ART

Application of the hot melt adhesives used in adhesion melting high polymer by heat and adhering with hot melt method is expanding in various fields by the reason of superiority in high speed coating, rapid hardening, no solvent required, barrier property, energy-saving and economic rationality, etc. As conventional hot melt adhesives, a resin produced by blending adhesive capacity applying resin and plasticizer to a base polymer such as natural rubber, ethylene-vinyl acetate copolymer, styrene-butadiene-styrene block copolymer, styrene-isoprene-styrene block copolymer is mainly employed. However, the aforesaid base polymer contains many double bonds. Therefore, as the resin for hot melt adhesives by the use of the foregoing base polymer, there were problems such as inferior thermostability in heating, occurrences of oxidation, gelation, decomposition and coloration in coating and a change of bonding strength in adhesive part with the passage of time. Moreover, there was drawback to be inferior in adhesive property with lowly polar substances such as polyethylene or polypropylene. Regarding a resin for hot melt adhesives to these lowly polar substances, there was conventionally a resin using polypropylene, etc. as the base polymer. However, although these resins are superior in thermal stability, there were problems of too high degrees in hardness of the base polymer, necessity of coating at high-temperature covering poor flowing ability, inferior thermostability at high-temperature and insufficient adhesive property.

DISCLOSURE OF THE INVENTION

Overcoming the foregoing problems or drawbacks in the resin for hot melt adhesives, an object of the present invention is to provide a polyolefin resin for hot melt adhesives that is superior in thermostability or flowing ability at high-temperature, in adhesive property to lowly polar substances and in heat resistance of the adhesion face.

The present invention was completed by zealously investigating and finding that a polyolefin resin for hot melt adhesives comprising a specific propylene polymer and an adhesive capacity applying resin enables to achieve the object of the invention. That is, the present invention provides the following polyolefin resins for hot melt adhesives.

[1] A polyolefin resin for hot melt adhesives comprising [I] a propylene polymer in an amount of 20 to 99 mass %, and [II] an adhesive capacity applying resin in an amount of 80 to 1 mass %, wherein [I] the propylene polymer satisfies the following requirements of:
(1) a meso pentad fraction (mmmm) is from 0.2 to 0.6; and
(2) a racemic pentad fraction (rrrr) and (1−mmmm) satisfy the following relation:

$$[rrrr/(1-mmmm)] \leq 0.1.$$

[2] The polyolefin resin for hot melt adhesives as defined in the item [1] wherein [I] the propylene polymer satisfies the following requirement of:
(3) an intrinsic viscosity [η] measured at 135° C. in tetralin is from 0.01 to 2.0 deciliter/g.
[3] The polyolefin resin for hot melt adhesives as defined in the item [1] or the item [2], wherein [I] the propylene polymer satisfies the following requirement of:
(4) an amount of a component which is eluted at 25° C. or lower through temperature rise chromatography (W 25) is from 20 to 100 mass %.
[4] The polyolefin resin for hot melt adhesives according to any one of the items [1], [2] or [3], wherein [I] the propylene polymer is polymerized by the use of a metallocene catalyst containing a promoter and a transition metallic compound in which a cross-linking structure is formed via two cross-linking groups.
[5] The polyolefin resin for hot melt adhesives according to any one of the items [1], [2], [3] or [4] wherein [II] the adhesive capacity applying resin is a hydrogenated petroleum resin.

THE MOST PREFERRED EMBODIMENT TO CARRY OUT THE INVENTION

The present invention proposes a polyolefin resin for hot melt adhesives comprising [I] a specific propylene polymer in an amount of 20 to 99 mass % and [II] an adhesive capacity applying resin in an amount of 80 to 1 mass %. The polyolefin resin for hot melt adhesives of the present invention can be employed in various fields such as sanitary materials, for packaging, for bookbinding, for fibers, for woodworks, for electricity materials, for can manufacturing, for construction, for bag making, etc. The present invention shall be explained below in further details.

The [I] specific propylene polymer employed for the present invention satisfies the following requirements of:

(1) a mesopentad fraction (mmmm) is from 0.2 to 0.6; and
(2) a racemic pentad fraction (rrrr) and (1−mmmm) satisfy the following relation:

$$[rrrr/(1-mmmm)] \leq 0.1.$$

Although the present invention requires that the propylene polymer satisfies (1) and (2) above, the meso pentad fraction (mmmm) is desirable to be 0.3–0.6 and more desirable to be 0.4–0.5. In addition, the relation between the racemic pentad fraction (rrrr) and (1−mmmm) is desirable to be [rrrr/(1−mmmm)]≦0.08, more desirable to be [rrrr/(1−mmmm)]≦0.06 and the most desirable to be [rrrr/(1−mmmm)]≦0.05.

When [I] the propylene polymer satisfies the foregoing relation, the obtained polyolefin resin for hot melt adhesive will be superior in the balance of low elastic modulus and heat resistance. In other words, it has advantages in small elastic modulus, superior softness (or flexibility) and adhesive property, and excellent heat resistance. When the meso pentad fraction (mmmm) of the propylene polymer is less than 0.2, the heat resistance is not enough. When the meso pentad fraction of the propylene polymer (mmmm) exceeds 0.6, it is not desirable because the melting point elevates and the coating requires high-temperature. The [rrrr/(1−mmmm)] of the propylene polymer more than 0.1 causes heat-resistant depression.

The meso pentad fraction (mmmm fraction) in the present invention is obtained by means of a method proposed in "Macromolecules, 6, 925 (1973)" by A. Zambelli, et al., and is defined as a meso fraction in pentad unit among polypropylene molecular chain measured on the basis of the signal attributed to the methyl group in the $^{13}$C-NMR spectrum. Large meso pentad fraction means high stereoregularity of the propylene polymer. Similarly, the racemic pentad fraction (rrrr fraction) is defined as a racemic fraction in pentad unit among polypropylene molecular chain. The value [rrrr/(1−mmmm)] is obtained by the fraction in pentad unit and exists as an indicator expressing uniformity of stereoregularity distribution of propylene polymer. When the [rrrr/(1−mmmm)] value becomes large, it means that stereoregularity distribution expands, and that mixture of high stereoregular polypropylene (PP) and atactic polypropylene (APP) like the conventional polypropylene produced with using existing catalyst system is prepared with increased sticking and degraded transparency. Further, the measurement of $^{13}$C-NMR spectrum is conducted in accordance with peak attribution proposed in "Macromolecules, 8, 687 (1975)" by A. Zambelli, et al., with the following apparatus and under the following condition.

Apparatus: "JNM-EX400 Model $^{13}$C-NMR spectrometer" produced by JEOL Ltd.

Method: complete proton decoupling method

Concentration: 220 mg/milliliter

Solvent: A mixed solvent of 1,2,4-trichlorobenzene and benzene-$d_6$ with volume ratio of 90:10.

Temperature: 130° C.

Pulse width: 45°

Pulse repetition time: 4 seconds

Integration: 10,000 times

Regarding the propylene polymer of the present invention, beside the foregoing requirement, (3) an intrinsic viscosity [η] measured at 135° C. in tetralin is desirable to be 0.01 to 2.0 deciliter/g. The intrinsic viscosity [η] is more desirable to be 0.1–1.5 deciliter/g and particularly desirable to be 0.15–1.2 deciliter/g. When the intrinsic viscosity [η] is less than 0.01 deciliter/g, enough adhesion strength would not be obtained. When the intrinsic viscosity exceeds 2.0 deciliter/g, the polymer may have a poor coating ability due to deteriorated fluidity.

Furthermore, besides the foregoing requirements (1), (2) and (3), the propylene polymer of the present invention may be preferable to satisfy that (4) an amount of a component which is eluted at 25° C. or lower through temperature rise chromatography (W25) is from 20 to 100 mass %. The amount of eluted component at 25° C. or lower (W 25) is desirable to be from 30 to 100 mass %, more desirable to be from 50 to 100 mass % and the most desirable to be from 60 to 100 mass %. The term "W25" is defined as the amount of an eluted component (mass %) which is not adsorbed onto a filler at the column temperature of 25° C. on TREF column obtained on the basis of an elution curve prepared by temperature rise chromatography according to operation method, apparatus constitution and measurement condition described below in EXAMPLES. W25 is an index for expressing whether the propylene polymer is soft or not. Large value of W25 means that the polymer contains many components of low elastic modulus and/or that non-uniformity of stereoregularity distribution extends. In the present invention, when W25 is less than 20%, it may be unfavorable because the polymer loses flexibility.

The propylene polymer of the present invention is preferable to be further satisfying any one of the following requirements (a) to (d).

(a) The polymer preferably has a molecular weight distribution (Mw/Mn) of 4 or less, more preferably 3.5 or less and the most preferably 3 or less as measured by gel permeation chromatography (GPC). When the molecular weight distribution (Mw/Mn) exceeds 4, the polymer tends to become sticky. The Mw/Mn is measured by gel permeation chromatography (GPC) method described in EXAMPLES below.

(b) A melting endothermic amount Δ H obtained by a differential scanning calorimeter (DSC) measurement of the polymer is preferable to be 30 J/g or less because the polymer becomes superior in flexibility. In the present invention, the value Δ H is an index to express whether the polymer is soft or not, and large value of the index means that the polymer has a high elastic modulus and poor flexibility.

(c) A melting point (Tm) and a crystallization temperature (Tc) may be either present or absent, but they are preferably absent from the viewpoint of flexibility. It is desirable particularly to have a low melting point (Tm) of 100° C. or lower. With regards to the values of Δ H, Tm and Tc, they are determined according to DSC measurement described below in EXAMPLES.

(d) A tensile elastic modulus of the polymer is desirable to be 100 MPa or less, and more desirable to be 70 MPa or less.

The propylene polymer used in the present invention may be accepted by satisfying both the foregoing (1) and (2), and may be accepted by further copolymerizing 2 mass % or less of comonomer of other than propylene as far as without departing from the object of the present invention. Examples of the comonomer include ethylene, 1-butene, 1-pentene, 4-methyl-1-pentene, 1-hexene, 1-octene, 1-decene, 1-dodecene, 1-tetradecene, 1-hexadecene, 1-octadecene, 1-eicosene, etc. These comonomers may be used alone or in combination of two or more in the present invention.

As a manufacturing method of [I] the propylene polymer used for this invention, polymerization or copolymerization of the propylene employing the metallocene catalyst obtained by combining (A) transition metal compound having cross-linking structure formed via two cross-linking groups with (B) a promoter together is preferable. Specifically, [I] the propylene polymer used in the present invention is preferably produced through a method in which polymerization of propylene or copolymerization of propylene, in the presence of a polymerization catalyst containing (A) transition metallic compound and (B) a promoter component selected from among (B-1) a compound capable of forming an ionic complex through reaction with (A) the transition metallic compound or a derivative thereof and (B-2) an aluminoxane, (A) the transition metallic compound being represented by the following general formula (I).

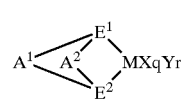

(I)

wherein M is a metal element of Groups 3 to 10 or lanthanum series of the Periodic Table; $E^1$ and $E^2$ are the same or different and each independently is a ligand selected from the group consisting of substituted cyclopentadienyl, indenyl, substituted indenyl, heterocyclopentadienyl, substituted heterocyclopentadienyl, amido, phosphide, hydrocarbyl and silicon-containing group; and $E^1$ and $E^2$ are crosslinked via $A^1$ and $A^2$; X is a ó-bonding ligand; and a plurality of X, if any, may be same or different and each X may be crosslinked with another X, $E^1$, $E^2$ or Y; Y is a Lewis base; and a plurality of Y, if any, may be same or different and each Y may be crosslinked with another Y, $E^1$, $E^2$ or X; $A^1$ and $A^2$ may be the same or different divalent group for crosslinking two ligands $E^1$ and $E^2$ and each independently is hydrocarbon group having 1 to 20 carbon atoms, halogen-containing hydrocarbon group having 1 to 20 carbon atoms, silicon-containing group, germanium-containing group, tin-containing group, —O—, —CO—, —S—, —SO$_2$—, —Se—, —NR$^1$—, —PR$^1$—, —P(O)R$^1$—, —BR$^1$— or —AlR$^1$— wherein $R^1$ is hydrogen, halogen, hydrocarbon group having 1 to 20 carbon atoms or halogen-containing hydrocarbyl having 1 to 20 carbon atoms; q is an integer of 1 to 5 given by the formula, [(valence of M)−2]; and r is an integer of 0 to 3.

Operative examples of transition metal compound expressed by general formula (I) include (1,2'-dimethylsilylene) (2,1'-dimethylsilylene) bis (3-n-butylindenyl) zirconium dichloride, (1,2'-dimethylsilylene) (2,1'-dimethylsilylene) bis(3-trimethylsilylmethylindenyl) zirconium dichloride, (1,2'-dimethylsilylene) (2,1'-dimethylsilylene) bis(3-phenylindenyl) zirconium dichloride, (1,2'-dimethylsilylene) (2,1'-dimethylsilylene) bis (4,5-benzoindenyl) zirconium dichloride, (1,2'-dimethylsilylene) (2,1'-dimethylsilylene) bis(4-isopropyl indenyl) zirconium dichloride, (1,2'-dimethylsilylene) (2,1'-dimethylsilylene) bis(5,6-dimethyl indenyl) zirconium dichloride, (1,2'-dimethylsilylene)(2,1'-dimethylsilylene) bis(4,7-di-i-propylindenyl) zirconium dichloride, (1,2'-dimethylsilylene)(2,1'-dimethylsilylene) bis(4-phenylindenyl) zirconium dichloride, (1,2'-dimethylsilylene)(2,1'-dimethylsilylene) bis(3-methyl-4-i-propylindenyl) zirconium dichloride, (1,2'-dimethylsilylene) (2,1'-dimethylsilylene) bis(5,6-benzoindenyl) zirconium dichloride, (1,2'-dimethylsilylene)(2,1'-isopropylidene), -bis (indenyl) zirconium dichloride, (1,2'-dimethylsilylene)(2,1'-isopropylidene)-bis(3-carbinylindenyl) zirconium dichloride, (1,2'-dimethylsilylene)(2,1'-isopropylidene)-bis (3-i-propylindenyl) zirconium dichloride, (1,2'-dimethylsilylene) (2,1'-isopropylidene)-bis(3-n-butylindenyl) zirconium dichloride, (1,2'-dimethylsilylene) (2,1'-isopropylidene)-bis(3-trimethylsilylmethylindenyl) zirconium dichloride, etc. and these substituted chemical compound employing titanium or hafnium instead of zirconium.

Next, examples of (B-1) component among component (B) include tetraphenylborate triethyl ammonium, tetraphenylborate tri-n-butylammonium, tetraphenylborate trimethylammonium, tetraphenylborate tetraethylammonium, tetraphenylborate methyl (tri-n-butyl) ammonium, tetraphenylborate benzyl (tri-n-butyl) ammonium, etc. (B-1) may be used alone or in combination of two or more kinds thereof.

On the other hand, examples of aluminoxanes as (B-2) component include methylaluminoxane, ethylaluminoxane, isobutylaluminoxane, etc. These aluminoxanes may be used alone or in combination of two or more.

The polymerization catalyst used in the present invention may further contain, in addition to the components (A) and (B), an organoaluminum compound as the component (C). Examples of the organoaluminum compound as the component (C) include trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, and ethylaluminum sesquichloride. These organoaluminum compounds may be used alone or in combination of two or more.

In the polymerization of the propylene, at least one of the catalyst components may be carried on a suitable support. Polymerization method is not particularly limited and any one of slurry polymerization method, gas phase polymerization method, bulk polymerization method, solution polymerization method, suspension polymerization method, etc. is applicable, however, bulk polymerization method or solution polymerization method is particularly desirable.

Polymerization temperature is usually from −100° C. to 250° C. The molar ratio of the starting monomer or monomers to the component (A) is preferably 1 to $10^8$, more preferably 100 to $10^5$. Furthermore, the polymerization time is usually 5 minutes to 10 hours, and the polymerization reaction pressure is usually from ordinary pressure to 20 MPa (gauge).

Examples of [II] the adhesive capacity applying resin used for the polyolefin resin for hot melt adhesives of the present invention include a rosin resin made from crude turpentine as material, a terpene resin made from α-pinene or β-pinene provided from essential oil of pine, a petroleum resin obtained by polymerization and resinification of a restoration including unsaturated hydrocarbon generating as byproduct of thermal decomposition of petroleum naphtha, etc., and those hydrogenated additives. Typical examples of [II] the adhesive capacity applying resin include I-MARV P-125, I-MARV P-100 and I-MARV P-90 all available from Idemitsu Petrochemical Co., Ltd., Yumex 1001 available from Sanyo Chemical Industries Co., Ltd., Hi-rez T 1115 available from Mitsui Chemical Co., Ltd., Clearon K 100 available from Yasuhara Chemical Co., Ltd., ECR 227 and Escorez 2101 both available from Tonex Inc., Arkon P 100 available from Arakawa Chemical Industries Co., Ltd. and Regalrez 1078 available from Hercules Inc., etc.

In the present invention, the hydrogenated additives are preferably used considering miscibility with the base polymer. Among the hydrogenated additives, a hydride of the petroleum resin that is superior in thermal stability is desirable.

Further, in the present invention, various additives such as (C) plasticizer, (D) inorganic filler and (E) anti-oxidant can be optionally blended to the polyolefin resin for hot melt adhesives. Examples of (C) plasticizer include paraffinic process oil, polyolefinic wax, phthalic esters, adipic acid esters, fatty acid esters, glycols, epoxy polymer plasticizer, naphthenic oil, etc. Examples of (D) inorganic filler include clay, talc, calcium carbonate, barium carbonate, etc. The (E) anti-oxidants may be phosphorus anti-oxidants, phenol anti-oxidants and sulfur anti-oxidants. Examples of the phosphorus anti-oxidants include tris(nonylphenyl) phosphite, distearylpentaerythritol diphosphite, Adekastab 1178 (available from Asahi Denka Kogyo K.K.), Sutamilizer TNP (available from Sumitomo Chemical Company Ltd.), Irgafos 168 (available from Ciba Specialty Chemicals Corp.) and SandstabP-EPQ (available from Sand Corp.). Examples of the phenol anti-oxidants include 2,6-di-t-butyl-4-methylphenol, n-octadecyl-3-(3',5'-di-t-butyl-4'-hydroxyphenyl) propionate, Sumilizer BHT (available from Sumitomo Chemical Company Ltd.), Irganox 1010 (available from Ciba Specialty Chemicals Corp.), etc. Examples of the sulfur anti-oxidants include dilauryl-3,3'-thiodipropionate, pentaerythritol tetrakis(3-laurylthiopropionate), Sumilizer TPL (available from Sumitomo Chemical Company Ltd.), Yoshinox DLTP (available from Yoshitomi Seiyaku Co., Ltd.), Antiox L (available from NOF Corporation), etc.

A polyolefin resin for hot melt adhesives of the present invention comprises [I] a propylene polymer in an amount of 20 to 99 mass %, and [II] an adhesive capacity applying resin in an amount of 80 to 1 mass %. Preferably, it comprises [I] the propylene polymer in an amount of 25 to 95 mass %, and [II] the adhesive capacity applying resin in an amount of 75 to 5 mass %. More preferably, it comprises [I] the propylene polymer in an amount of 30 to 85 mass %, and [II] the adhesive capacity applying resin in an amount of 70 to 15 mass %. In particular, it desirably comprises [I] the propylene polymer in an amount of 35 to 75 mass %, and [II] the adhesive capacity applying resin in an amount of 65 to 25 mass %.

(A Production Method of the Polyolefin Resin for Hot Melt Adhesives)

A polyolefin resin for hot melt adhesives of the present invention is produced by dry-blending 20–99 mass % of [I] the propylene polymer, 80–1 mass % of [II] the adhesive capacity applying resin and optional additives using a Henschel mixer, etc. and by melt-kneading them with single or double-screw extruder, a Banbery mixer, etc. A desirable quantity of blending [I] the propylene polymer and [II] the adhesive capacity applying resin is as the foregoing description. Examples of the optional additives include the foregoing (C) plasticizer, (D) inorganic filler, (E) anti-oxidant, etc. A blending quantity of (C) plasticizer is preferably 0–50 mass %, and more preferably 0–30 mass % in the polyolefin resin for hot melt adhesives. A blending quantity of (D) inorganic filler is preferably 0–50 mass %, and more preferably 0–30 mass % in the polyolefin resin for hot melt adhesives. A blending quantity of (E) anti-oxidant is preferably 0–1 mass %, and more preferably 0–0.5 mass % in the polyolefin resin for hot melt adhesives.

The present invention shall be explained below in further details with reference to examples, but the present invention shall by no means be restricted by the following examples.

[Production of the Propylene Polymer (P1)]

(1) Synthesis of Complex Synthesis of (1,2'-dimethylsilylene)(2,1'-dimethylsilylene)-bis(3-trimethylsilylm ethylindene) Zirconium Dichloride In 50 milliliter of THF placed in a Schlenk bottle, 3.0 g (6.97 millimole) of a lithium salt of (1,2'-dimethylsilylene)(2,1'-dimethylsilylene)-bis(indene) was dissolved and the resultant solution was cooled to −78° C. After slowly dropping 2.1 milliliter (14.2 millimole) of iodomethyltrimethylsilane, the solution was stirred at room temperature for 12 hours. The solvent was removed by distillation and 50 milliliter of ether was added to the residue, followed by washing with a saturated ammonium chloride solution. By drying an organic phase after a phase separation of the residue and removing the solvent, 3.04 g (5.88 millimole) of (1,2'-dimethylsilylene)(2,1'-dimethylsilylene)-bis(3-trimethylsilylm ethylindene) was obtained (yield: 84%).

Then, 3.04 g (5.88 millimole) of (1,2'-dimethylsilylene)(2,1'-dimethylsilylene)-bis(3-trimethylsilylm ethylindene) prepared above and 50 milliliter of ether were charged under a nitrogen flow into a Schlenk bottle. The resultant solution was cooled to −78° C., added with 7.6 milliliter (11.7 millimole) of a 1.54 M solution of n-BuLi in hexane, and then stirred at room temperature for 12 hours. After removing the solvent by distillation, the solid product was washed with 40 milliliter of hexane to obtain 3.06 g (5.07 millimole) of a lithium salt as ether additing product (yield: 73%).

The results of measurement by $^1$H-NMR (90 MHz, THF-$d_8$) were δ 0.04 (s, 18H, trimethylsilyl), 0.48 (s, 12H, dimethylsilylene), 1.10 (t, 6H, methyl), 2.59 (s, 4H, methylene), 3.38 (q, 4H, methylene), 6.2–7.7 (m, 8H, Ar—H).

The lithium salt was dissolved in 50 milliliter of toluene under nitrogen flow. After cooling to −78° C., a suspension, which was cooled to −78° C. in advance, of 1.2 g (5.1 millimole) of zirconium tetrachloride in 20 milliliter of toluene was added dropwise to the solution. After completion of addition, the resultant mixture was stirred at room temperature for 6 hours and then filtered. The residue was recrystallized from dichloromethane to obtain 0.9 g (1.33 millimole) of (1,2'-dimethylsilylene)(2,1'-dimethylsilylene)-bis(3-trimethylsilylm ethylindenyl)zirconium dichloride (yield: 26%).

The results of measurement by $^1$H-NMR (90 MHz, CDCl$_3$) were δ 0.0 (s, 18H, trimethylsilyl), 1.02, 1.12 (s, 12H, dimethylsilylene), 2.51 (dd, 4H, methylene), 7.1–7.6 (m, 8H, Ar—H).

(2) Polymerization of Propylene

A stainless steel autoclave with a capacity of 10 liter and having an agitator sequentially received 4 liter of n-heptane, 2 millimole of triisobutylaluminium, 2 millimole of methylaluminoxane (available from Albemarle Corp.) and 2 micromole of (1,2'-dimethylsilylene) (2,1'-dimethylsilylene)-bis(3-trimethylsilylmethylindenyl) zirconium dichloride obtained above. Then, after introducing hydrogen up to 0.2 MPa (gauge), a propylene gas was introduced into the autoclave to get the total pressure of 0.8 MPa (gauge) while raising the temperature up to 60° C. In the polymerization, the propylene was continuously fed into the autoclave though a pressure controller until the total pressure reached 0.8 MPa (gauge). After continuing the polymerization at 60° C. for 30 minutes, the reaction mixture was taken out and dried under reduced pressure to obtain a propylene polymer (P1).

The following additives were blended with the propylene polymer (P1), and the blend was granulated into pellets by extruding from a single-screw extruder (TLC35-20 Model produced by Tsukada Juki Seisakusho Co., Ltd.).

(Additive Prescription)

(a) Phenol Anti-oxidant:
   Irganox 1010 available from Ciba Specialty Chemicals Corp.: 500 ppm (b) Phosphorus Anti-oxidant:
   Irgafos 168 available from Ciba Specialty Chemicals Corp.: 1,000 ppm The results of evaluation in accordance with the following "Evaluation method of resin characteristic of propylene polymer" are shown in Table 1.

"Evaluation Method of Resin Characteristic of the Propylene Polymer"

(1) Measurement of [η]:
   An intrinsic viscosity [η] of the polymer was measured at 135° C. in tetralin using an automatic viscometer "VMR-053 Model" produced by Rigosha Co., Ltd.

(2) Measurement of a Pentad Fraction:
   A pentad fraction was measured by the method described in the description.

(3) Measurement of the Melt Flow Rate (MFR):
   A MFR was measured at 230° C. and under weighted load of 21.18 N according to JIS K7210.

(4) Measurement of Molecular Weight Distribution (Mw/Mn):
   A Mw/Mn was measured by the use of apparatus described below.

GPC Apparatus:
   Column: TOSO GMHHR-H(S)HT
   Detector: RI Detector for liquid chromatogram
   "WATERS 150C"

Measurement Condition
   Solvent: 1,2,4-trichlorobenzene
   Measuring temperature: 145° C.
   Flow velocity: 1.0 milliliter/minute
   Sample concentration: 2.2 mg/milliliter
   Injection amount: 160 microliter
   Analytical curve: Universal Calibration
   Analysis program: HT-GPC (Ver.1.0)

(5) DSC Measurement:
   A differential scanning calorimeter ("DSC-7" produced by Perkin Elmer Co., Ltd.) was used. After melting 10 mg sample by heating at 120° C. for 3 minutes in nitrogen atmosphere, the sample was cooled to −40° C. at a cooling rate of 1° C./minute. The peak top of the maximum peak of the crystallization exothermic curve was defined as the crystallizing point Tc (° C.). The cooed sample was kept at −40° C. for 3 minutes, and then heated at a temperature rising rate of 10° C./minute to obtain a melting endothermic curve. A melting endothermic amount was expressed as ΔH. The peak top of the maximum peak of the melting endothermic curve was taken as the melting point Tm (° C.).

(6) Temperature Rise Fractionation Chromatograph:
   According to the following procedure, W 25, a quantity of eluted component (mass %) without being adsorbed onto a filler at the column temperature of 25° C. on TREF in an elution curve was obtained.

(a) Operation Method

Introducing a sample solution into the TREF column regulated at a temperature of 135° C., subsequently cooling down to 0° C. with cooling rate of 5° C./hour by degrees, holding at 0° C. for 30 minutes so that the sample is adsorbed to the filler. Then, elevating the temperature of the column up to 135° C. with rising rate of 40° C./hour, the elution curve can be obtained.

(b) Apparatus Constitution

TREF column: Silicagel column (4.6φ×150 mm) produced by GL science company

Flow cell: KBr cell of light path length 1 mm produced by GL science company

Liquid feeding pump: SSC-3100 pump produced by Senshu Science Company

Valve oven: MODEL554 oven (high-temperature type) produced by GL Science Company TREF oven: produced by GL Science Company Dual system temperature controller: REX-C100 temperature controller produced by Rigaku Kogyou Company Detector: Infrared detector for liquid chromatography MIRAN 1A CVF produced by FOXBORO Company Ten way valve: Electric valve produced by Valco Company Loop: 500 microliter loop produced by Valco Company (c) Measuring Condition Solvent: o-dichlorobenzene Sample concentration: 7.5 g/liter Injection amount: 500 microliter Pumping rate: 2.0 milliliter/minute Detection wave number: 3.41 μm Column filler: Chromosorb P (30–60 mesh)

Column temperature distribution: within ±0.2° C.

EXAMPLE 1

After blending 60 mass % of pellets of the foregoing polymer P1 and 40 mass % of a hydrogenated petroleum resin I-MARV P-125 available from Idemitsu Petrochemical Co., Ltd. (referred to as B1 below), a polyolefin resin for hot melt adhesives was obtained by melt-kneading the mixture with Plastomill (produced by Toyo Seiki Co., Ltd.) at 180° C. for 30 minutes. Applying this resin to a polyethylene telephthalate (PET) film with a thickness of 50 μm, and subsequently heat sealing a stretched polypropylene film at 120° C. on the surface, a hot melt adhesive article was obtained. The results of evaluation in accordance with the following "Evaluation method" are shown in Table 2.

"Evaluation Method"

(1) Resinous Melt Viscosity of the Resin for Hot Melt Adhesives

The resinous viscosity of the resin for hot melt adhesives was determined in accordance with JIS K-6862 under the following conditions:

Viscometer: Brookfield type viscometer

Temperature: 180° C.

(2) Peel-Apart Adhesive Strength of the Hot Melt Adhesive Article

The peel-apart adhesive strength of the hot melt adhesive article was determined in accordance with JIS K-6854 under the following conditions:

Specimen: Width of 25 mm and length of 100 mm.

(3) Shear Adhesion Break Temperature of the Hot Melt Adhesive Article

The shear adhesion break temperature of the hot melt adhesive article was measured in order to evaluate the heat resistance of the article in accordance with JIS K-6859 under the following conditions:

Specimen: 25 mm×25 mm

Load: 1 kg

Temperature rising rate: 2° C./minute

The higher the shear adhesion break temperature of the hot melt adhesive article, the better the heat resistance.

(4) Resinous Heat Color Tone Evaluation of the Resin for Hot Melt Adhesives

Regarding the thermostability of the resin for hot melt adhesives at high-temperature, a color tone of 20 g of the resin after heating at 180° C. for 72 hours in a glass bottle was evaluated by visual observation. The smaller the degree of coloration, the better the thermal stability.

Criterion for Evaluation:

A (Practical): changed to light yellow

C (Poor): changed to dark yellow or brown

EXAMPLE 2

EXAMPLE 2 was conducted as EXAMPLE 1 except changing the amount of B1 in the manufacture of the polyolefin resin for hot melt adhesives to 30 mass %, and adding 10 mass % of a paraffinic process oil. The results are shown in Table 2.

EXAMPLE 3

EXAMPLE 3 was conducted as EXAMPLE 1 with the exception of using I-MARV P-90 (refered to as B2 below) available from Idemitsu Petrochemical Co., Ltd., instead of B1 in EXAMPLE 1. The results are shown in Table 2.

[Production of the Propylene Polymer (P2)]

(1) Preparation of Magnesium Compound

A glass reactor with a capacity of 6 liter and having a stirrer was fully purged with nitrogen gas, and then charged with about 2,430 g of ethanol, 16 g of iodine and 160 g of metallic magnesium. The mixture was heated under stirring and the reaction was continued under reflux until the generation of hydrogen gas was no longer noticed, thereby obtaining a solid product. The reaction liquid containing the solid product was dried under reduced pressure to obtain a magnesium compound.

(2) Preparation of a Solid Catalyst Component (A)

A glass reactor with a capacity of 5 liter was fully purged with nitrogen gas, and then charged 160 g of the magnesium compound (not ground) prepared in Step 1, 80 milliliter of purified heptane, 24 milliliter of silicon tetrachloride, and 23 milliliter of diethyl phthalate. Then, 770 milliliter of titanium tetrachloride was added to the mixture with stirring while keeping the mixture at 80° C., and the reaction was allowed to proceed at 110° C. for 2 hours. The resulting solid component was separated and washed with purified heptane at 90° C. The reaction was further allowed to proceed by adding 1,220 milliliter of titanium tetrachloride at 110° C. for 2 hours. The product was fully washed with purified heptane to obtain a solid catalyst component (A).

(3) Gas Phase Polymerization of Propylene

The polymerization was conducted at 70° C. under 2.8 MPa (Gauge) by feeding into a 200-liter polymerization reactor the solid catalyst component (A) prepared in Step 2 at a rate of 6.0 g/hour, triisobutylaluminum (TIBA) at a rate of 0.2 mol/hour, 1-allyl-3,4-dimethoxybenzene (ADMB) at a rate of 0.012 mol/hour, cyclohexylmethyldimethoxysilane (CHMDMS) at a rate of 0.012 mol/hour, and propylene at a rate of 37 kg/hour. The powdery polypropylene was blended with 2,5-dimethyl-2,5-di-(tert-butylperoxy)-hexane, and then prescribed with the following additives. The resulting mixture was extruded into pellets through a single screw extruder (TLC 35-20 type produced by Tsukada Juki Seisakusho Co.). The results of evaluation with regard to the prepared pellets (P2) in accordance with the foregoing "Evaluation method of resin characteristic of propylene polymer" are shown in Table 1. In the DSC measurement, the melting of sample was conducted for 3 minutes by raising the temperature from 120° C. to 220° C. in the afore-mentioned measuring method.
(Additive Prescription)
(a) Phenol Anti-Oxidant:
  Irganox 1010 available from Ciba Specialty Chemicals Corp.: 1000 ppm
(b) Phosphorus Anti-Oxidant:
  P-EPQ: 500 ppm
(c) Neutralizer:
  Calcium stearate: 500 ppm
(d) Neutralizer:
  DHT-4A: 500 ppm

Comparative Example 1

COMPARATIVE EXAMPLE 1 was conducted as EXAMPLE 1 with the exception of using pellet P2 instead of pellet P1. The results are shown in Table 2.
[Production of Propylene Polymer (P3)]

A stainless steel autoclave with a capacity of 1 liter received 400 milliliter of heptane, 0.5 millimole of triisobutylaluminium, 2 micromole of dimethyl anilinium (pentafuluorophenyl) borate and a catalyst component provided by preparedly contacting with toluene for five minutes with 1 micromol of (the third grade butylamide) dimethyl (tetramethyl-$\eta^5$-cyclopentadienyl) silane titanium dichloride prepared as Example 1 of Japanese Patent Application Laid-Open No. 3–163088. After introducing hydrogen up to 0.03 MPa (Gauge), a propylene gas was introduced into the autoclave until the total pressure reached 0.8 MPa (Gauge). Propylene was continuously fed into the autoclave though a pressure controller to maintain the polymerization pressure constant. After continuing the polymerization at 70° C. for 1 hour, the reaction mixture was taken out and dried under reduced pressure to obtain a propylene polymer (P3). The results of evaluation with regard to the prepared pellet (P3) in accordance with the foregoing "Evaluation method of resin characteristic of propylene polymer" in EXAMPLE 1 are shown in Table 1.

Comparative Example 2

COMPARATIVE EXAMPLE 2 was conducted as EXAMPLE 1 with the exception of using pellet P3 obtained above instead of pellet P1. The results are shown in Table 2.

Comparative Example 3

COMPARATIVE EXAMPLE 3 was conducted as EXAMPLE 1 with the exception of changing the amount of the styrene-butadiene-styrene block copolymer to 40 mass %, changing the amount of B1 to 40 mass %, and changing the amount of the paraffin process oil to 20 mass % in the manufacture of the polyolefin resin for hot melt adhesives. The results are shown in Table 2.

TABLE 1

| Resin Property | P1 | P2 | P3 |
| --- | --- | --- | --- |
| [η] (deciliter/g) | 0.5 | 2.1 | 1.9 |
| mmmm | 0.45 | 0.57 | 0.02 |
| rrrr | 0.024 | 0.09 | 0.108 |
| rrrr/(1 − mmmm) | 0.04 | 0.21 | 0.11 |
| W25 (mass %) | 91 | 30 | 91 |
| MFR (g/10 minutes) | 310 | 2 | 2 |
| Mw/Mn | 2.0 | 2.3 | 2.2 |
| ΔH (J/g) | 23 | 65.2 | — |
| Tm (° C.) | 75 | 159 | — |
| Tc (° C.) | 34 | 105 | — |

Note: In Table 1, "—" means not observed.

TABLE 2

| | | EX. 1 | EX. 2 | EX. 3 | COM. EX. 1 | COM. EX. 2 | COM. EX. 3 |
| --- | --- | --- | --- | --- | --- | --- | --- |
| Component [I] | P1 (mass %) | 60 | 60 | 60 | — | — | — |
| | P2 (mass %) | — | — | — | 60 | — | — |
| | P3 (mass %) | — | — | — | — | 60 | — |
| Component [II] | B1 (mass %) | 40 | 30 | — | 40 | 30 | 40 |
| | B2 (mass %) | — | — | 40 | — | — | — |
| Other | P Oil (mass %) | — | 10 | — | — | 10 | 20 |
| Component | SBS (mass %) | — | — | — | — | — | 40 |
| Results of | Melt Viscosity (mPa*s) | 7,000 | 4,500 | 6,100 | 100,000 or more | 9,800 | 9,500 |
| Evaluation | P-A Ad St. (N/cm) | 11.1 | 9.8 | 10.5 | 0.9 | 0.5 | 6.7 |
| | Shear Ad Br Temp. (° C.) | 79 | 72 | 75 | 72 | 68 | 74 |
| | Heat Color Tone | A | A | A | A | A | C |

Notes: In Table 2, "EX." is an abbreviation of "EXAMPLE", "COM." is an abbreviation of "COMPARATIVE", "SBS" means Styrene-Butadiene-Styrene block copolymer, "P Oil" means Paraffin Process Oil, "P-A Ad St." means Peel-Apart Adhesive Strength and "Shear Ad Br Temp." means Shear Adhesion Break Temperature.

INDUSTRIAL APPLICABILITY

According to the present invention, a polyolefin resin for hot melt adhesives that is superior in thermostability or flowing ability at high-temperature, being easy for coating, being environmentally friendly with little fear of generating toxic gas in the disposal and incineration, being superior in adhesive property to lowly polar substances and in heat resistance of the adhesion face is provided.

What is claimed is:

1. A polyolefin resin for hot melt adhesives, comprising:
   [I] a propylene polymer in an amount of 20 to 99 mass %; and
   [II] a resin which improves the adhesive capacity in an amount of 80 to 1 mass %;
   wherein the propylene polymer [I] satisfies the following requirements:

(1) a meso pentad fraction (mmmm) is from 0.2 to 0.6;

(2) a racemie pentad fraction (rrrr) and (1−mmmm) satisfy the following relation:

$$[rrrr/(1-mmmm)] \leq 0.1; \text{ and}$$

(3) an intrinsic viscosity [η] measured at 135° C. in tetralin is 0.01 to 2.0 deciliter/g.

2. A polyolefin resin for hot melt adhesives, comprising:

[I] a propylene polymer in an amount of 20 to 99 mass %; and

[II] a resin which improves the adhesive capacity in an amount of 80 to 1 mass %;

wherein the propylene polymer [I] satisfies the following requirements:

(1) a meso pentad fraction (mmmm) is from 0.2 to 0.6;

(2) a racemic pentad fraction (rrrr) and (1−mmmm) satisfy the following relation:

$$[rrrr/(1-mmmm)] \leq 0.1; \text{ and}$$

(4) an amount of a component which is eluted at 25° C. or lower through temperature rise chromatography (W 25) is from 20 to 100 mass %.

3. The polyolefin resin for hot melt adhesives according to claim 1, wherein said propylene polymer [I] is polymerized in the presence of a metallocene catalyst containing a promoter and a transition metallic compound in which a cross-linking structure is formed via two cross-linking groups.

4. The polyolefin resin for hot melt adhesives according to claim 1, wherein said resin [II] which improves the adhesive capacity is hydrogenated petroleum resin.

5. A method of manufacturing a polyolefin resin for hot melt adhesives, comprising:

dry blending [I] a propylene polymer in an amount of 20 to 99 mass %, and [II] a resin which improves the adhesive capacity in an amount of 80 to 1 mass %; and melt-kneading the blended resin;

wherein the propylene polymer [I] satisfies the following requirements:

(1) a meso pentad fraction (mmmm) is from 0.2 to 0.6;

(2) a racemic pentad fraction (rrrr) and (1−mmmm) satisfy the following relation:

$$[rrrr/(1-mmmm)] \leq 0.1; \text{ and}$$

(3) an intrinsic viscosity [η] measured at 135° C. in tetralin is 0.01 to 2.0 deciliter/g.

6. A method of manufacturing a polyolefin resin for hot melt adhesives, comprising:

dry blending [I] a propylene polymer in an amount of 20 to 99 mass %, and [II] a resin which improves the adhesive capacity in an amount of 80 to 1 mass %; and melt-kneading the blended resin;

wherein the propylene polymer [I] satisfies the following requirements:

(1) a meso pentad fraction (mmmm) is from 0.2 to 0.6;

(2) a racemic pentad fraction (rrrr) and (1−mmmm) satisfy the following relation:

$$[rrrr/(1-mmmm)] \leq 0.1; \text{ and}$$

(4) an amount of a component which is eluted at 25° C. or lower through temperature rise chromatography (W 25) is from 20 to 100 mass %.

7. The method of manufacturing a polyolefin resin for hot melt adhesives according to claim 5, wherein said propylene polymer [I] is polymerized in the presence of a metallocene catalyst containing a promoter and a transition metallic compound in which a cross-linking structure is formed via two cross-linking groups.

8. The method of manufacturing a polyolefin resin for hot melt adhesives according to claim 5, wherein said resin [II] which improves the adhesive capacity is a hydrogenated petroleum resin.

9. The polyolefin resin for hot melt adhesives according to claim 2, wherein said propylene polymer [I] is polymerized in the presence of a metallocene catalyst containing a promoter and a transition metallic compound in which a cross-linking structure is formed via two cross-linking groups.

10. The polyolefin resin for hot melt adhesives according to claim 2, wherein said resin [II] which improves the adhesive capacity is hydrogenated petroleum resin.

11. The method of manufacturing a polyolefin resin for hot melt adhesives according to claim 6, wherein said propylene polymer [I] is polymerized in the presence of a metallocene catalyst containing a promoter and a transition metallic compound in which a cross-linking structure is formed via two cross-linking groups.

12. The method of manufacturing a polyolefin resin for hot melt adhesives according to claim 6, wherein said resin [II] which improves the adhesive capacity is a hydrogenated petroleum resin.

\* \* \* \* \*